US012143033B2

United States Patent
Christen et al.

(10) Patent No.: US 12,143,033 B2
(45) Date of Patent: Nov. 12, 2024

(54) FLYING CAPACITOR SWITCHING CELL-SYSTEM

(71) Applicant: ABB E-mobility B.V., Delft (NL)

(72) Inventors: Daniel Christen, Uster (CH); Mario Schweizer, Rütihof (CH); Hemant Bishnoi, Wettingen (CH); Sami Pettersson, Dietikon (CH)

(73) Assignee: ABB E-mobility B.V., Delft (NL)

( * ) Notice: Subject to any disclaimer, the term of this patent is extended or adjusted under 35 U.S.C. 154(b) by 0 days.

(21) Appl. No.: 17/902,865

(22) Filed: Sep. 4, 2022

(65) Prior Publication Data

US 2022/0416686 A1    Dec. 29, 2022

Related U.S. Application Data

(63) Continuation of application No. PCT/EP2021/053647, filed on Feb. 15, 2021.

(30) Foreign Application Priority Data

Mar. 5, 2020  (EP) .................................. 20161242

(51) Int. Cl.
| | |
|---|---|
| *H02M 7/483* | (2007.01) |
| *H02M 7/00* | (2006.01) |
| *H02M 7/493* | (2007.01) |
| *H02M 1/088* | (2006.01) |

(52) U.S. Cl.
CPC ......... *H02M 7/4837* (2021.05); *H02M 7/003* (2013.01); *H02M 7/493* (2013.01); *H02M 1/088* (2013.01)

(58) Field of Classification Search
CPC .... H02M 7/003; H02M 7/4837; H02M 7/493; H02M 1/088
See application file for complete search history.

(56) References Cited

U.S. PATENT DOCUMENTS

| | | | |
|---|---|---|---|
| 7,499,290 B1 | 3/2009 | Mazzola et al. | |
| 8,952,670 B2 | 2/2015 | Huang et al. | |
| 10,530,249 B1 | 1/2020 | Lee et al. | |
| 2004/0208030 A1 | 10/2004 | Bhate et al. | |
| 2013/0249514 A1 | 9/2013 | Huang et al. | |
| 2014/0084993 A1 | 3/2014 | Takao et al. | |
| 2014/0111174 A1* | 4/2014 | Shtargot .................... G05F 1/10 | |
| | | | 323/282 |
| 2015/0280608 A1 | 10/2015 | Yoscovich et al. | |

(Continued)

FOREIGN PATENT DOCUMENTS

| | | |
|---|---|---|
| DE | 112013001234 T5 | 1/2015 |
| DE | 112014006352 T5 | 10/2016 |

(Continued)

OTHER PUBLICATIONS

Chou et al., "An Interleaved 6-Level GaN Bidirectional Converter for Level II Electric Vehicle Charging," *IEEE Applied Power Electronics Conference and Exposition (APEC)*, pp. 594-600 (Mar. 17-21, 2019).

(Continued)

*Primary Examiner* — Jue Zhang

(74) *Attorney, Agent, or Firm* — Leydig, Voit & Mayer, Ltd.

(57) ABSTRACT

A flying capacitor switching cell-system includes at least two flying capacitor switching cells, wherein each of the cells comprises an arrangement of at least one semiconductor system, and wherein the cells are in parallel in an electrical circuit.

17 Claims, 3 Drawing Sheets

(56) References Cited

U.S. PATENT DOCUMENTS

2018/0226886 A1  8/2018  Fürst et al.
2019/0363644 A1  11/2019  Li et al.

FOREIGN PATENT DOCUMENTS

| | | |
|---|---|---|
| EP | 0735634 A1 | 10/1996 |
| EP | 1445853 A2 | 8/2004 |
| EP | 2722987 A1 | 4/2014 |
| EP | 3751716 A1 | 12/2020 |
| FR | 2679715 A1 | 1/1993 |
| FR | 3040113 A1 | 2/2017 |
| WO | 2019/092926 A1 | 5/2019 |

OTHER PUBLICATIONS

Infineon, "Mosfet OptiMOS™ 5 Power-Transistor, 150 V,"IPB044MN15N5, downloaded from the Internet on Aug. 30, 2022, at https://www.infineon.com/cms/en/product/power/mosfet/n-channel/ipb044n15n5/, 10 pp. (2016).

European Patent Office, Extended European Search Report in European Patent Application No. 20161242.1, 9 pp. (Mar. 9, 2020).

European Patent Office, International Search Report in International Patent Application No. PCT/EP2021/053647, 4 pp. (Apr. 26, 2021).

European Patent Office, Written Opinion in International Patent Application No. PCT/EP2021/053647, 7 pp. (Apr. 26, 2021).

Fujii et al., "Comparison of Hard-Switched Multi-Level Inverter Topologies for STATCOM by Loss-Implemented Simulation and Cost Estimation," *IEEE 36$^{th}$ Power Electronics Specialists Conference*, 340-346 (Jan. 1, 2005).

Zhang et al., "Survey on Fault-Tolerant Techniques for Power Electronic Converters," *IEEE Transactions on Power Electronics*, 29(12): 13 pp. (Dec. 1, 2014).

European Patent Office, Office Action in European Patent Application No. 20161242.1, 11 pp. (May 10, 2023).

\* cited by examiner

FLYING CAPACITOR SWITCHING CELL-SYSTEM

CROSS-REFERENCE TO RELATED APPLICATIONS

This patent application claims priority to International Patent Application No. PCT/EP2021/053647, filed on Feb. 15, 2021, which claims priority to European Patent Application No. 20161242.1, filed on Mar. 5, 2020, both of which are incorporated herein in their entireties by reference.

FIELD OF THE DISCLOSURE

The instant application is directed to a flying capacitor switching system and, more particularly, to a converter system comprising the flying capacitor switching cell-system.

BACKGROUND OF THE INVENTION

FR 2 679 715 A1 refers to an electronic device for converting electrical energy between a voltage source and a current source. The device consists of cascaded switching cells each having two switches, and includes capacitors which are combined with said cells to distribute the source voltage to the switches, as well as control logics which ensures energy exchanges are synchronized in order to re-strict the voltage borne by each switch to a fraction of the supply voltage, to re-strict the output voltage ripple amplitude to the same fraction, and to impart to said voltage ripple a frequency which is a multiple of the switching frequency of the switches.

US 2015/280608 A1 refers to an apparatus comprising: a multi-level inverter comprising a first phase circuit and a second phase circuit, each of the first and the second phase circuits comprising a flying capacitor circuit; a first set of switches connecting the first phase circuit between voltage input terminals and a second set of switches connecting the second phase circuit between the voltage input terminals; and an interphase balancing circuit comprising a first pair of terminals connected in parallel across the first phase circuit and a second pair of terminals connected in parallel across the second phase circuit.

EP 0 735 634 A1 refers to a pulse generator circuit which comprises a power supply source for outputting a high voltage signal. A first capacitor is charged with the high voltage signal output by the power supply source. A load device is supplied with the high voltage signal charged in the first capacitor. A semiconductor switch together with the first capacitor and the load constitute a closed loop. A first diode is inserted between the power supply source and the closed loop. A second diode is inserted in a closed loop and operates to suppress electrical vibrations. The second diode has an opposite polarity to that of the first diode. A snubber circuit is arranged in parallel across the second diode. This snubber circuit comprises a second diode with an opposite polarity to that of said first diode, a second capacitor in series with said second diode, and a first resistor in parallel with said second capacitor.

US 2013/249514 A1 refers to serially connected low voltage transistors which are used to replace a high voltage transistor in a voltage conversion circuit for a driver, or parallel connected sub-transistors are used to establish a high voltage transistor having an effective size dynamically adjusted according to loading of the driver, to reduce switching loss and thereby improve the efficiency of the driver.

U.S. Pat. No. 7,499,290 B1 refers to components, systems and methods for generating variable frequency AC voltage from a DC power supply. The components include a full-bridge (FB) parallel load resonant (PLR) converter which operates in discontinuous conduction mode. The PLR converter includes MOSFETs in an H-bridge configuration and employs a topology which minimizes inductance. The PLR converter can be coupled to a single or poly-phase bridge for use as an inverter. The inverter can be used to produce an AC sinusoidal waveform from a low voltage, high current DC power supply. Systems and techniques for modulating the output from the PLR converter to produce an AC sinusoidal waveform having desired characteristics, including frequency and voltage, are also provided. The PLR converter can also be coupled to a rectifier for use as a DC-DC converter.

WO 2019/092926 A1 refers to an electronic circuit device having the effect of a parasitic inductance reduced and heat dissipation properties. This electronic circuit device is formed such that: circuit elements including a switching element are mounted on a first principal surface of a circuit board (PCB) along a predetermined direction; first wiring patterns that include virtual shortest current paths for connecting the respective circuit elements along the direction are formed; a second wiring pattern including facing current paths facing the formation regions of the virtual shortest current paths is formed on a second principal surface; vias and heat transfer vias are provided, said vias electrically connecting the first and second wiring patterns, said heat transfer vias connecting a switching element mounting region of the first principal surface and a facing current path side-portion region of the second principal surface; and a heat dissipation member touches the second principal surface.

EP 0 144 583 A2 refers to a method for the transmission of data determined in a telegraph and data exchange (EDS) regarding the duration of the existence of a connection to the calling subscriber device which participates in this connection and initiates the establishment of this connection, and which is connected, via a signal converter connected to the telegraph and data exchange, to the subscriber device which is called and participates in this connection and which outputs or receives data signals with a data transmission procedure different to that of the calling subscriber device, in such a manner that initially, in the course of a first partial connection existing between the calling subscriber device and the signal converter, the data signals to be transmitted are stored in this signal converter and that subsequently after a conversion the data signals stored in the signal converter are forwarded from said converter to the calling subscriber device in the course of a second partial connection via the telegraph and data exchange, the inclusion of this signal converter in the respective connection being effected by the telegraph and data exchange on account of a control signal output by the calling subscriber device, characterized in that the control signal which is output by the calling sub-scriber device and effecting the inclusion of a signal converter in a connection is stored in the telegraph and data exchange together with an allocation signal re-questing the transmission of data regarding the duration of the existence of said partial connections, in that, in the telegraph and data exchange after clearance of the first of the two partial connections, data determined regarding the duration of the existence of this partial connection are at first temporarily stored on account of the stored control signal, and in that these data, together with the data determined regarding the duration of the existence of this second partial connection after clearance of the second partial connection, are transmitted to the calling subscriber device under the control of the stored allocation signal in the course of a separate connection serving for the transmission of the data determined for the two partial connections.

US 2018/226886 A1 refers to a half-bridge arrangement having a circuit board having at least four trace layers and two switching elements and a capacitor device arranged on opposite sides of the circuit board and interconnected so as to produce, during a commutation event of the half-bridge arrangement, at least two dipoles having opposite spatial directions.

US 2004/208030 A1 refers to a high-power pure-sinewave inverter amenable to mass manufacturing techniques. Methods for increasing the power rating, power density and/or power conversion efficiency of a sinewave-modulated pulse-width-modulated (PWM) inverter having an either half-bridge or full-bridge topology, including minimizing uncoupled inductances and loop inductances in the primary winding(s) by employing either ribbon-like conductors having a high cross-sectional aspect ratio. A compact linear heatsink adapted to cool a row of semi-conductor devices (such as inverter switches) mounted on a high-current printed circuit board. Methods for inexpensive manufacture of a fluid-cooled linear heat sink. A transformer including a filter inductor core.

In the flying capacitor stage, low voltage MOSFETs may be used, which are low cost devices and provide a high current capability. A MOSFET is an active device with at least three terminals, that means three electrodes being a gate, a drain and a source. In some designs, an additional terminal, such as a bulk or a substrate, is led to the outside, which is connected to the back of the chip. Since a voltage at the back of the chip generates additional electric fields that act on the channel, changing the voltage at the additional terminal shifts the threshold volt-age of the MOSFET. However, in most cases the substrate is internally connected to the source.

Like other field-effect transistors, the MOSFET acts as a voltage-controlled resistor, which means that the gate-source voltage can be used to change the resistance between the drain and source, and thus the current by resistance by several orders of magnitude. The key to understanding this resistance change in a MOS structure is the creation (enhancement types) or pinch-off (depletion types) of a conductive channel under the gate (see below for details).

The MOSFETs are arranged in switching cell, wherein the flying capacitor stage consists of several consecutively connected switching cells to achieve the desired blocking voltage.

A single MOSFET die only has a limited current carrying capacity. In order to build higher power converters, these MOSFETs have to paralleled for increased current capacity. The application of this topology is not limited to such technical field though, but can be used wherever a three-phase inverter is required, like drives, power quality (active filters), uninterruptable power supplies (UPS) and as grid interface for electric vehicle (EV) charging systems.

To achieve an increased power capability of the converter system usually the approach of hard-paralleling MOSFETs is chosen. However, this often results in an unwanted increase of the parasitic inductances and unevenly shared currents and losses in the devices. Consequently, the power capability of the converter system has to be reduced.

BRIEF SUMMARY OF THE INVENTION

One topology of a multilevel inverters is a flying capacitor (FC) multilevel inverter. The flying capacitor (FC) multilevel inverter is also called flying capacitor switching cell-system in the context of this application. An inverter converts DC supply into AC supply. The DC source can be provided from any source, such as solar energy or wind energy. FC multilevel inverters have obtained their name due to the capacitors float with respect to earth's potential. The FC multilevel inverter is a topology to ensure a modular design.

The setup of a FC multilevel inverter is similar to the setup of a diode clamped multilevel inverter. This type of multilevel inverter requires capacitor to be pre-charged. The topology consists of diodes, capacitors and switching devices. Each leg consists of switching devices which are semiconductor switches. Every inverter limb consists of cells connected in inward nested series. Every cell has a single capacitor and two power switches. A power switch is a combination of a transistor connected with an anti-parallel diode. An inverter with N cell will have 2N switches and N+1 different voltage levels including zero. The number of levels depends up-on the number of conducting switches in each limb.

In one aspect, the present disclosure describes improved flying capacitor cell systems. In particular, the currents should be more balanced in the flying capacitor cell system. In particular, it should also be provided by the invention that switching losses should be reduced.

In one embodiment, the disclosure describes a flying capacitor switching cell-system, comprising at least two flying capacitor switching cells, wherein each of the cells comprises an arrangement of at least one semiconductor system, wherein the cells are in parallel in an electrical circuit. The cells can comprise a series of low voltage MOSFET devices, parallel and/or series connections of semiconductor devices. In particular, the cells comprise a series of low voltage MOSFET devices, and/or series connections of semiconductor devices.

In other words, the parallel arrangement according to the invention refers to the cells which are the ones in parallel and the parallel arrangement according to the invention does not refer to cells that would increase the number of voltage levels in the multilevel converter.

The disclosure also describes a converter system comprising the flying capacitor switching cell-system according to the invention. Additionally, the converter system may comprise features of the flying capacitor switching cell-system according to any of the preferred embodiments.

One notable aspect of the embodiments described herein is that the layout and the arrangement of metal oxide field-effect transistors (MOSFETs), that will be used to build the power scaled-up version of the above presented topology by paralleling flying capacitor switching cells. The arrangement of MOSFET switching cells is improved by the invention, the power of a flying capacitor converter is scaled, particularly also allowing using printed circuit board technology, such that the construction of the cell is extendable if a higher output current capability is required.

BRIEF DESCRIPTION OF THE SEVERAL VIEWS OF THE DRAWING(S)

DETAILED DESCRIPTION OF THE INVENTION

The design examples describe relatively small cells and arrangements with relatively few cells. The invention also comprises larger cells with a plurality of semi-conductor devices which can be arranged according to the principle described be-low or according to one of the embodiments described as advantageous. Like-wise, any number of cells can be connected in parallel to each other.

Figure 1:
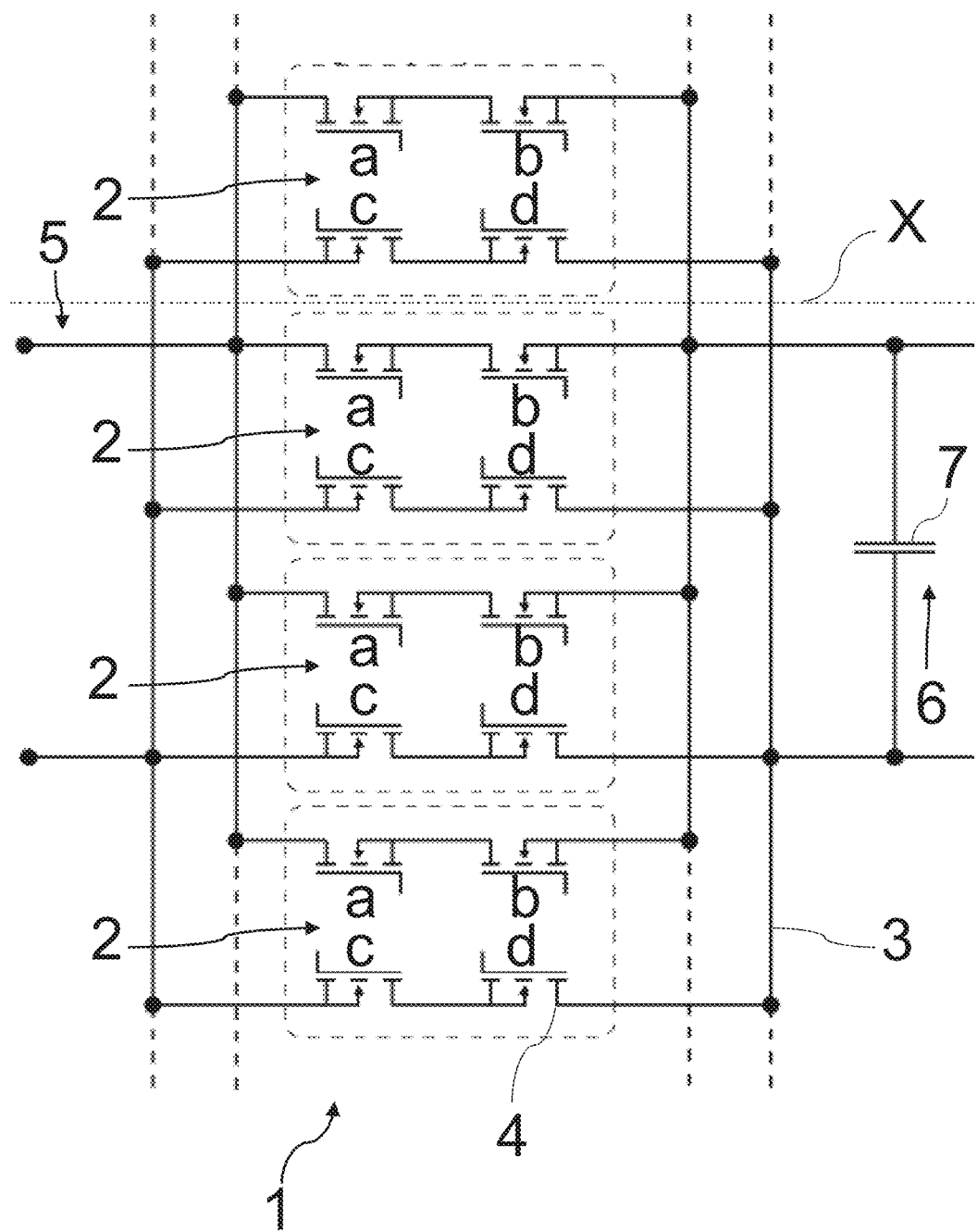
FIG. 1 is a diagram for a flying capacitor switching cell-system according to a first embodiment of the instant disclosure.

FIG. 1 shows a flying capacitor switching cell-system 1 according to a first embodiment. The flying capacitor switching cell-system 1 comprises four flying capacitor switching cells 2, to which it will be shortly referred by "cells" 2. Each of the cells 2 comprises an arrangement of four semiconductor systems.

According to the embodiment, the semiconductor systems each are a metal-oxide-semiconductor field-effect transistor (MOSFET) 4. The MOSFETs 4 are indicated by letters a, b, c and d for each of the cells 2.

In the electrical circuit 3 adjacent cells 2 are connected in parallel. The electrical circuit 3 comprises an input side 5 and an output side 6. The input side 5 of the cells 2 could be terminated with another flying capacitor switching cell, or a dc-voltage source or another configuration of switches such as an active neutral-point clamped (ANPC) configuration. The output side 6 can be terminated by another cell 2, either with a capacitor 7 or without the capacitor 7 and with terminals at the output side 6 short circuited to form the phase output.

Figure 2:
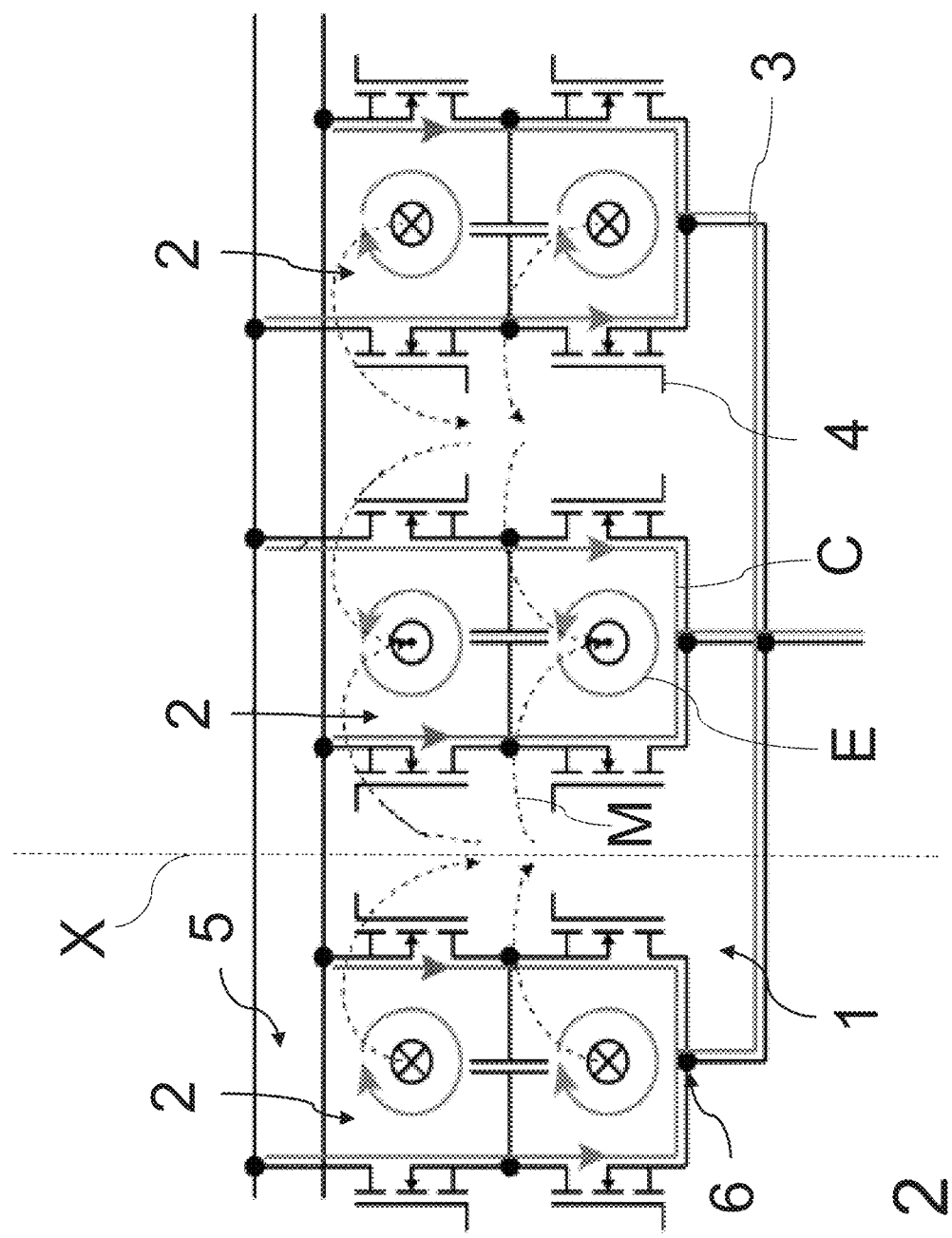
FIG. 2 is a diagram of a flying capacitor switching cell-system according to a second embodiment of the instant disclosure.

FIG. 2 shows a flying capacitor switching cell-system 1 according to a second embodiment. The flying capacitor switching cell-system 1 comprises three flying capacitor switching cells 2. Each of the cells 2 comprises an arrangement of four semiconductor systems. According to the embodiment, the semiconductor systems each are a MOSFET 4. Furthermore, each of the cells 2 comprises a capacitor which does not have a reference sign. The capacitor is arranged between two MOSFET pairs connected in parallel circuit arrangement, wherein the pairs are connected in series. The current flow direction is indicated by arrows in the circuit with the reference number C.

The cells 2 are configured such that a magnetic field of one cell 2 points in a different direction than the magnetic field of another adjacent cell 2. Between the cells 2, a cancellation of a magnetic field can be achieved. Field lines M of the magnetic field generated by each of the cells 2 are schematically indicated by dashed lines. Furthermore, a direction of a generated eddy current is indicated schematically by a circling arrow with the reference number "E" in each cell 2.

The cells 2 are arranged in an alternating way such that the magnetic field is naturally cancelled out. This means, that the arrangement of devices of neighboring cells 2 are mirrored with respect to each other. The cells 2 are mirrored on an ax-is X, wherein the axis X is between the cells 2. In the example in FIG. 2 it can be seen that the resulting magnetic field in neighboring cells 2 has a different sign. Thus, the magnetic field between the cells is cancelled out such that they cannot induce current.

FIGS. 1 and 2 show cells with four semiconductor devices. Also, more semiconductor devices per cell 2 are possible. Further, in the present examples, the cells 2 are single connected in parallel. It is also possible that more cells are 2 arranged by always alternating neighboring cells 2.

Figure 3:
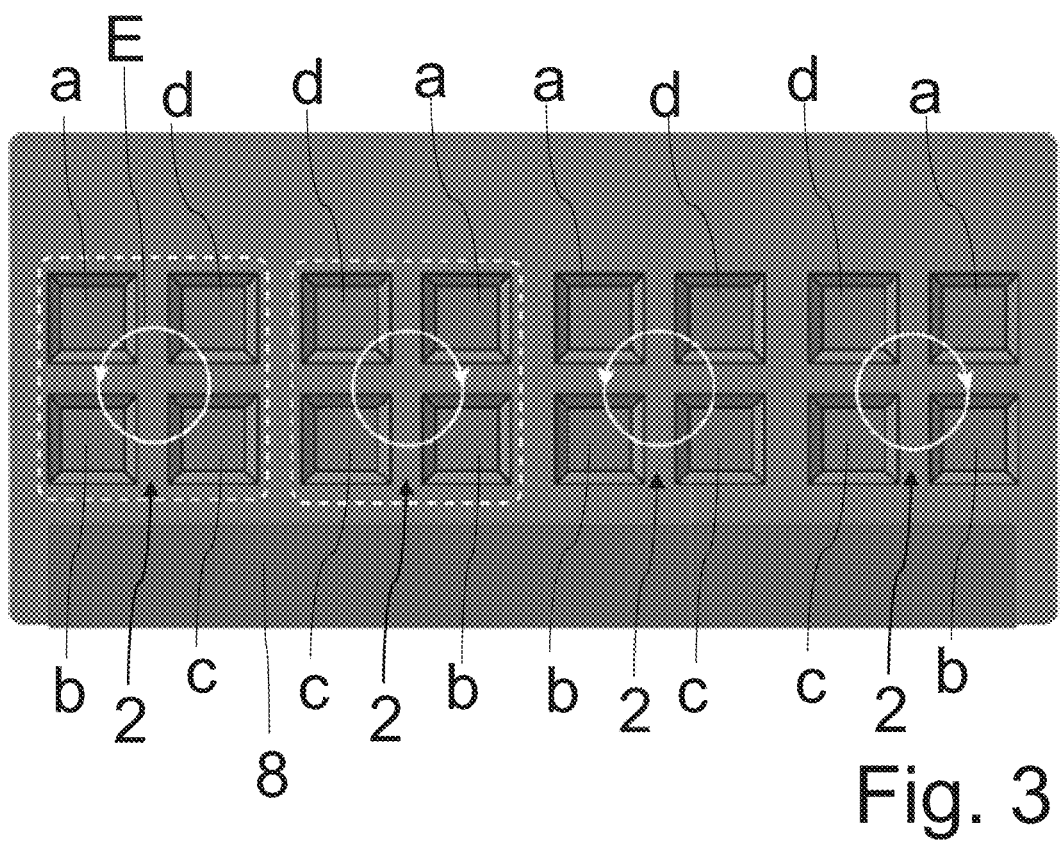
FIG. 3 is a diagram for an alternating configuration of the flying capacitor switching cells on a PCB according to an embodiment of the present disclosure.

FIG. 3 shows an alternating configuration of the flying capacitor switching cells 2 on a PCB 8 according to an embodiment. To illustrate a possible alternating arrangement of MOSFETs 4, the letters a, b, c, d identifying the MOSFETs 4 in FIG. 1 are shown for each cell 2. Here the MOSFETs 4 of adjacent cells 2 connected in parallel are arranged mirror-inverted to each other.

Figure 4A:
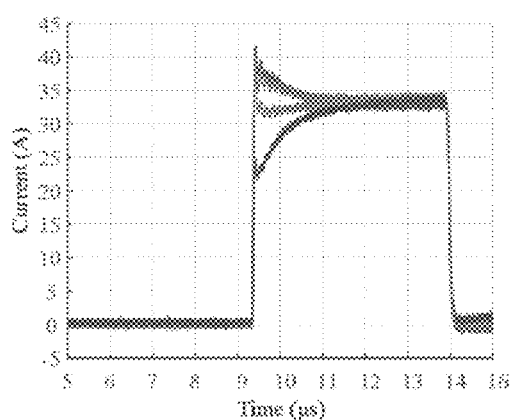
FIG. 4A is a schematic diagram of the input current for four parallel switching cells according to the first embodiment of the present disclosure.

FIG. 4A shows a schematic diagram of the input current for four parallel switching cells 2 according to the first embodiment of the invention.

Figure 4B:
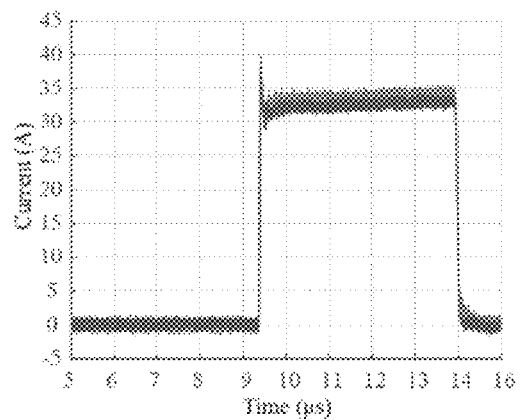
FIG. 4B is a schematic diagram of the input current for four parallel switching cells according to the second embodiment of the present disclosure.

FIG. 4B shows a schematic diagram of the input current for four parallel switching cells 2 which are alternately arranged according to the second embodiment of the invention. In the Figure it can be seen that the currents of the different cells 2 can be perfectly balanced by arranging the cells in alternating way.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

In general, the present disclosure illustrates that balanced conduction and switching losses in paralleled MOSFETs will be ensured, if the current in the paralleled MOSFETs is same during switching and after switching.

Furthermore, the commutation loops for each parallel connected semiconductor system, more particular for each parallel connected MOSFET, are symmetrical. Thereby, the same current during switching can be ensured.

Furthermore, the commutation loop of each semiconductor system, more particular of each MOSFET, can be made as small as possible. This will ensure low switching losses as well.

A further advantage is that the system only has to be configured to balance currents during switching. Once the currents in the paralleled semiconductor systems, more particular in the paralleled MOSFETs, have the same current during switching, they will also have the same current after switching. In particular, the semiconductor systems, more particular the MOSFETs have a thermal resistance to the heat-sink which is same.

According to a preferred embodiment of the invention, the cells are configured such that magnetic field of one cell points in a different direction than the magnetic field of other parallel and adjacent cells. This means that the resulting magnetic field in neighbouring cells has a different sign. An arrangement and design such that the magnetic fields of adjacent cells point in different directions also means that the cells are arranged in an alternating arrangement. The alternating arrangement of flying capacitor switching cells weakens a coupling of the magnetic fields generated by the individual cells and in the best case cancels magnetic field coupling and enables evenly shared currents especially during the switching transients. The equal distribution of currents is particularly pronounced in combination with a parallel arrangement of the cells.

The alternating arrangement allows avoiding unbalanced currents when a plurality of cells are connected in parallel. When the cells are connected in parallel, the current switches or transitions from one branch within the switching cell to the other. This introduces a circulating current within the switching cell and accordingly a magnetic field. In an arrangement without alternating cell layout, the induced current generated by this magnetic field in the paralleled switching cells, enforces the actual current transition in those switching cells. This effect results in unevenly shared currents of the switching cells during switching transients and mainly depends on the current rise and fall rate.

The previously described alternating arrangement can be applied for several paralleled switching cells in a continuing manner. Also, instead of having a series connection of low voltage devices, this concept can be also applied if the switching cell would consist of single devices or an arbitrary number of series or parallel connected devices. In particular, this concept is applied if the switching cell would consist of single devices or an arbitrary number of series connected devices.

The aforementioned preferred embodiment allows that magnetic shielding, for example a conductive sheet or naturally by the heat sink, in which by eddy currents a counteracting magnetic field is generated, is not necessary. The advantage is that more compact cell arrangements are also possible.

According to a preferred embodiment of the invention, the cells are configured such that the magnetic field of one cell points in an opposite direction than the magnetic field of the other parallel, adjacent cell. In this way, a coupling of the magnetic fields generated by the individual cells can be avoided particularly effectively and at the same time an even distribution of currents in the cells can be favoured. The equal distribution of currents is particularly pronounced in combination with a parallel arrangement of the cells. This means that heating of the MOSFETs in the paralleled cells can be balanced.

According to a preferred embodiment of the invention, each of parallel, adjacent cells are arranged mirrored to each other. For example, the components of a first cell can be mirrored with respect to their forward or reverse direction to the components of a second cell with respect to their forward or reverse direction. The forward and the reverse direction refers to the two branches of the semiconductor devices in a single flying capacitor cell. Described advantageous design reduces the strengthening of magnetic fields in a given cell due to the neighbouring paralleled cells.

According to a preferred embodiment of the invention, the cells are mirrored on an axis, wherein the axis is between the cells. This can mean the following, for example: In a cell comprising at least one MOSFET connected to the circuit to act as a blocking element and at least one MOSFET connected to the circuit to act as a conducting element, an adjacent cell having components connected in parallel with the components of the first cell is connected such that the blocking MOSFET of the adjacent cell is placed adjacent to the blocking MOSFET of the first cell and the conducting MOSFET of the adjacent cell is placed away from the conducting MOSFET of the first cell such that the two cells are mirror reflections of each other with respect of the axis. Described advantageous design reduces that magnetic fields of neighbouring cells strengthen.

According to a preferred embodiment of the invention, the MOSFETs of one cell are mirrored on the axis with regard to the MOSFETs of the parallel, adjacent cell with regard to their sources and drains. Described advantageous design reduces that magnetic fields of neighbouring cells strengthen.

According to a preferred embodiment of the invention, each of the semiconductor systems comprise one semiconductor device; or multiple semiconductor devices which are connected with each other in parallel or in series. In particular, several MOSFETs connected in parallel are advantageous for high power level applications.

According to a preferred embodiment of the invention, the semiconductor systems comprise metal-oxide-semiconductor field-effect transistors (MOSFETs) and/or insulated-gate bipolar transistors (IGBTs).

According to a preferred embodiment of the invention, the system comprises a printed circuit board (PCB) on which the at least two flying capacitor switching cells are installed in parallel. A printed circuit board (PCB) is a carrier for electronic components. It is used for mechanical fastening and electrical connection. Almost every electronic device contains one or more printed circuit boards. Printed circuit boards consist of electrically insulating material with conductive connections (conductor paths) adhering to it. Fibre-reinforced plastic is used as the insulating material, while hard paper is used for cheaper devices. The conductor tracks are usually etched from a thin layer of copper, usually 35 µm. The components are soldered on solder pads or in pads. In this way they are mechanically held and electrically connected at the same time. Larger components can also be attached to the circuit board with cable ties, adhesive or screw connections.

The types of printed circuit boards range from single-sided printed circuit boards to multilayers and special technologies, such as standard printed circuit boards, single and double sided printed circuit boards, multilayer with several layers, which are different, depending on the manufacturer, special technologies, wherein special technologies are used in all branches of industry and have special properties and requirements, high density interconnect (HDI) printed circuit board, insulated metal substrate (IMS) circuit board, printed circuit boards on glass. Using PCBs enables machine mounting of electronic components, increasing reliability, precision and decreasing cost of production.

In the context of this patent application, the formulation "at least two" comprises a plurality. In particular, this comprises the arrangement of a plurality of cells. In other words, the invention comprises providing multiple cells in parallel. Particularly, more cells to produce a greater number of levels in a multi-level converter. Thus, the application is not restricted to only 3 levels (2 cells+1).

Further embodiments and advantages of the method are directly and unambiguously derived by the person skilled in the art from the system as described before.

REFERENCE SIGNS LIST 1 flying capacitor switching cell-system
2 flying capacitor switching cell (cell)
3 electrical circuit
4 MOSFET
5 input side 6 output side
7 capacitor
8 PCB
a first MOSFET of the cell
b second MOSFET of the cell
c third MOSFET of the cell
d fourth MOSFET of the cell
C current flow direction
E Eddy current
M field lines of magnetic field
X axis All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flying capacitor switching cell-system, comprising:
    at least two flying capacitor switching cells;
    wherein each of the at least two flying capacitor switching cells comprises an arrangement of at least one semiconductor system;
    wherein the at least two flying capacitor switching cells are each arranged in a parallel circuit connection in an electrical circuit; and
    wherein the at least two flying capacitor switching cells are configured such that a magnetic field of a first flying capacitor switching cell points in a different direction than a respective magnetic field of a second flying capacitor switching cell when the first flying capacitor switching cell is disposed in a first parallel circuit connection mirrored with respect to a second parallel circuit connection of the second flying capacitor, such that the first flying capacitor switching cell is in parallel to the second flying capacitor switching cell, and such that the first and second flying capacitor switching cells are situated adjacent to one another in the electrical circuit.

2. The system according to claim 1, wherein the at least two flying capacitor switching cells are further configured such that a magnetic field of one cell points in an opposite direction than a respective magnetic field of other cell when the at least two flying capacitor switching cells are disposed in parallel circuit connection and are situated adjacent to one another in the electrical circuit.

3. The system according to claim 1, wherein the at least two flying capacitor switching cells are mirrored about an axis, X, that extends between the at least two flying capacitor switching cells.

4. The system according to claim 1, wherein the arrangement of the at least one semiconductor system includes at least one semiconductor device.

5. The system according to claim 1, wherein the arrangement of the at least one semiconductor system includes multiple semiconductor devices connected with each other in parallel circuit configuration.

6. The system according to claim 1, wherein the arrangement of the at least one semiconductor system includes multiple semiconductor devices connected with each other in series circuit configuration.

7. The system according to claim 1, wherein the at least one semiconductor system comprises at least one of metal-oxide-semiconductor field-effect transistors, MOSFETs and insulated-gate bipolar transistors (IGBTs).

8. The system according to claim 7, wherein the at least one semiconductor system comprises MOSFETs, and wherein the MOSFETs of one cell are mirrored about an axis, X, with regard to the MOSFETs of a parallel, adjacent cell with regard to sources and drains of the MOSFETs.

9. The system according to claim 1, further comprising a printed circuit board, PCB, on which the at least two flying capacitor switching cells are installed in parallel.

10. The system according to claim 1, wherein each of the first flying capacitor switching cell and the second flying capacitor switching cell are mirrored to each other with respect to their forward or reverse direction to the arrangement of the at least one semiconductor system.

11. A converter system comprising:
    at least two flying capacitor switching cells;
    wherein each of the at least two flying capacitor switching cells comprises an arrangement of at least one semiconductor system; and
    wherein the at least two flying capacitor switching cells are each arranged in a parallel circuit connection in an electrical circuit; and
    wherein the at least two flying capacitor switching cells are configured such that a magnetic field of a first flying capacitor switching cell points in a different direction than a respective magnetic field of a second flying capacitor switching cell when the first flying capacitor switching cell is disposed in a first parallel circuit connection mirrored with respect to a second parallel circuit connection of the second flying capacitor, such that the first flying capacitor switching cell is in parallel to the second flying capacitor switching cell, and such that the first and second flying capacitor switching cells are situated adjacent to one another in the electrical circuit.

12. The converter according to claim 11, wherein the at least two flying capacitor switching cells are further configured such that a magnetic field of one cell points in an opposite direction than a respective magnetic field of other cell when the at least two flying capacitor switching cells are disposed in parallel circuit connection and are situated adjacent to one another in the electrical circuit.

13. The converter according to claim 11, wherein the at least two flying capacitor switching cells are mirrored about an axis, X, that extends between the at least two flying capacitor switching cells.

14. The converter according to claim 11, wherein the arrangement of the at least one semiconductor system includes at least one semiconductor device.

15. The converter according to claim 11, wherein the arrangement of the at least one semiconductor system includes multiple semiconductor devices connected with each other in parallel circuit configuration.

16. The converter according to claim 11, wherein the arrangement of the at least one semiconductor system includes multiple semiconductor devices connected with each other in series circuit configuration.

17. The converter according to claim 11, wherein the at least one semiconductor system comprises at least one of metal-oxide-semiconductor field-effect transistors, MOSFETs and insulated-gate bipolar transistors (IGBTs).

* * * * *